(12) United States Patent
Wang

(10) Patent No.: US 8,619,060 B2
(45) Date of Patent: Dec. 31, 2013

(54) MULTI-TOUCH POSITIONING METHOD AND MULTI-TOUCH SCREEN

(75) Inventor: Yanfeng Wang, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 962 days.

(21) Appl. No.: 12/578,717

(22) Filed: Oct. 14, 2009

(65) Prior Publication Data

US 2010/0090986 A1  Apr. 15, 2010

(30) Foreign Application Priority Data

Oct. 15, 2008 (CN) .......................... 2008 1 0224095

(51) Int. Cl.
 *G06F 3/042* (2006.01)
(52) U.S. Cl.
 USPC ........................................................ 345/175
(58) Field of Classification Search
 USPC ........................................................ 345/175
 See application file for complete search history.

(56) References Cited

U.S. PATENT DOCUMENTS

2009/0219256 A1*  9/2009  Newton ......................... 345/173
2011/0205189 A1*  8/2011  Newton ......................... 345/175

FOREIGN PATENT DOCUMENTS

| CN | 101271372 A | 9/2008 |
| JP | 2000-506655 A | 5/2000 |
| WO | 98/07127 A1 | 2/1998 |
| WO | 2005/057921 A2 | 6/2005 |

\* cited by examiner

*Primary Examiner* — Abbas Abdulselam
*Assistant Examiner* — Shawna Stepp Jones
(74) *Attorney, Agent, or Firm* — Ladas & Parry LLP

(57) ABSTRACT

The present invention relates to a multi-touch positioning method and a multi-touch screen. The multi-touch positioning method comprising: emitting, by a first infrared ray generator set at a first angle of a display panel, infrared rays at a first wavelength; emitting, by a second infrared ray generator set at a second angle, infrared rays at a second wavelength; receiving the infrared rays of the first wavelength and generating a first infrared ray image by a first infrared ray image sensor set at an opposite angle of the first angle; receiving the infrared rays of the second wavelength and generating a second infrared ray image by a second infrared ray image sensor set at an opposite angle of the second angle; and performing processings for the first infrared ray image and the second infrared ray image to determine at least one touch point.

3 Claims, 8 Drawing Sheets

--- a first infrared ray generator set at a first angle of a display panel emits infrared rays at a first wavelength , and a second infrared ray generator set at a second angle emits infrared rays at a second wavelength — 101 a first infrared ray image sensor set at an opposite angle of the first angle receives the infrared rays of the first wavelength and generates a first infrared ray image , and a second infrared ray image sensor set at an opposite angle of the second angle receives the infrared rays of the second wavelength and generates a second infrared ray image — 102 processings for the first infrared ray image and the second infrared ray image are performed to determine at least one touch point — 103 a first infrared ray generator set at a first angle of a display panel emits infrared rays at a first wavelength , and a second infrared ray generator set at a second angle emits infrared rays at a second wavelength — 101 a first infrared ray image sensor set at an opposite angle of the first angle receives the infrared rays of the first wavelength and generates a first infrared ray image , and a second infrared ray image sensor set at an opposite angle of the second angle receives the infrared rays of the second wavelength and generates a second infrared ray image — 102 processings for the first infrared ray image and the second infrared ray image are performed to determine at least one touch point — 103

FIG.1

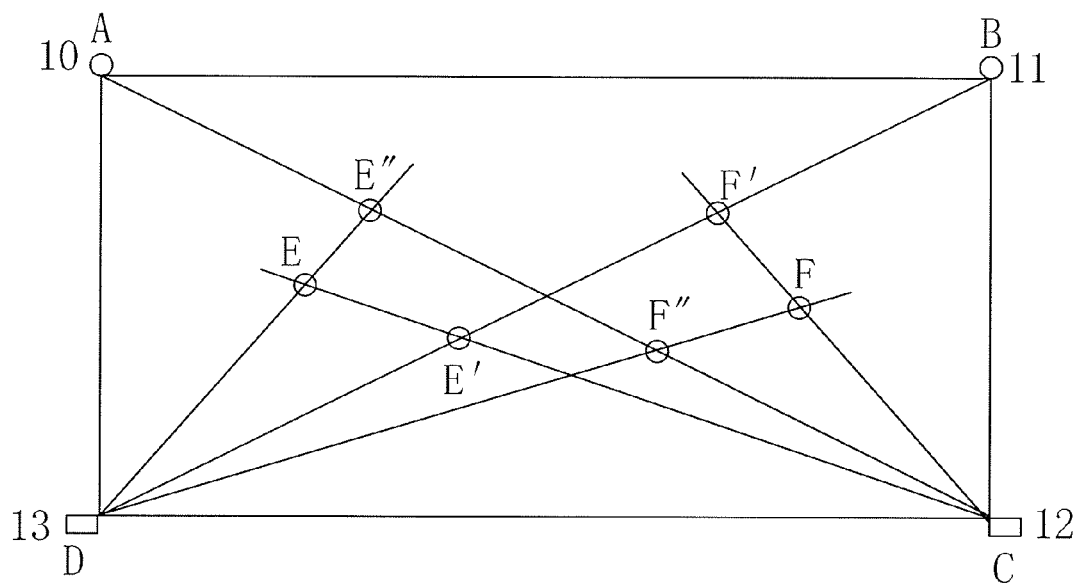

FIG.2

MULTI-TOUCH POSITIONING METHOD AND MULTI-TOUCH SCREEN

BACKGROUND

The present invention relates to a touch screen, and in particular relates to a multi-touch positioning method and a multi-touch screen.

A touch screen is a device which allows users to execute operations by simply touching the display screen with fingers or a touch pen, and has wide applications in many systems, such as desk-top computers, mobile phones, digital cameras, MP3/MP4s, laptops, ATM machines, etc. At present, the touch screen can generally comprise a touch panel, a display panel, and a control processing system. The touch panel records touch events, and sends touch signals generated by the touch events to the control processing system. The control processing system performs processing to the touch signals, and executes corresponding operations.

In the prior art, there are several touch screen techniques, including resistive, infrared ray, acoustic wave surface, electromagnetic touch screens, etc. However, these aforesaid touch screens can only recognize one touch point and cannot recognize multiple touch points simultaneously when the multiple points are touched on surface of the touch screen simultaneously, for example, when operations such as rotating a picture, zooming a picture, etc. are accomplished with touch by multiple fingers, when dragging a video which is currently playing and switching windows are accomplished simultaneously with touch by multiple fingers, or when operations such as dragging and deleting multiple folders, etc. are accomplished with touch by multiple fingers.

SUMMARY

The present invention provides a multi-touch positioning method and a multi-touch screen capable of recognizing multiple touch points on the touch screen simultaneously.

An embodiment of the present invention provides a multi-touch positioning method, in which a first infrared ray generator set at a first angle of a display panel emits infrared rays at a first wavelength, and a second infrared ray generator set at a second angle emits infrared rays at a second wavelength; a first infrared ray image sensor set at an opposite angle of the first angle receives the infrared rays of the first wavelength and generates a first infrared ray image, and a second infrared ray image sensor set at an opposite angle of the second angle receives the infrared rays of the second wavelength and generates a second infrared ray image; and processings for the first infrared ray image and the second infrared ray image are performed to determine at least one touch point.

Another embodiment of the present invention provides another multi-touch positioning method, which comprises: a first infrared ray generator set at a first angle of a display panel emits infrared rays at a first wavelength, a second infrared ray generator set at a second angle emits infrared rays at a second wavelength, a third infrared ray generator set at a third angle emits infrared rays at a third wavelength, and a fourth infrared ray generator set at a fourth angle emits infrared rays at a fourth wavelength; a first infrared ray image sensor set at an opposite angle of the first angle receives the infrared rays of the first wavelength and generates a first infrared ray image, a second infrared ray image sensor set at an opposite angle of the second angle receives the infrared rays of the second wavelength and generates a second infrared ray image, a third infrared ray image sensor set at an opposite angle of the third angle receives the infrared rays of the third wavelength and generates a third infrared ray image, and a fourth infrared ray image sensor set at an opposite angle of the fourth angle receives the infrared rays of the fourth wavelength and generates a fourth infrared ray image; and processings for the first infrared ray image, the second infrared ray image, the third infrared ray image, and the fourth infrared ray image are performed to determine at least one touch point.

The embodiment of the present invention further provides a multi-touch screen, which comprises a display panel, a first infrared ray generator set at a first angle of the display panel, a second infrared ray generator set at a second angle of the display panel, a first infrared ray image sensor set at an opposite angle of the first angle, a second infrared ray image sensor set at an opposite angle of the second angle, and a control processing sub-system connected to the display panel.

The display panel is used to receive touch events; the first infrared ray generator is used to emit infrared rays at a first wavelength; the second infrared ray generator is used to emit infrared rays at a second wavelength; the first infrared ray image sensor is used to receive the infrared rays emitted by the first infrared ray generator at the first wavelength and to generate a first infrared ray image; the second infrared ray image sensor is used to receive the infrared rays emitted by the second infrared ray generator at the second wavelength and to generate a second infrared ray image; and the control processing sub-system is used to perform processing for the first infrared ray image generated by the first infrared ray image sensor and the second infrared ray image generated by the second infrared ray image sensor, to determine at least one touch point.

The embodiment of the present invention generates the infrared ray images with touch point information carried by adopting the infrared ray generators set at two arbitrary angles of the display panel respectively and the infrared ray image sensors set at the opposite angles of the two arbitrary angles respectively, and determines the position of the touch point after the control processing sub-system performs processing for the infrared ray images, to enable the touch screen to recognize multiple touch points simultaneously and achieve a multi-touch positioning function of the touch screen; accuracy for recognizing the touch points is high and the method is easy to carry out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein:

FIG. 1 is a flow schematic diagram of a multi-touch positioning method provided by a first embodiment of the present invention;

FIG. 2 is a schematic diagram of the multi-touch positioning method provided by the first embodiment of the present invention;

Figure 3:
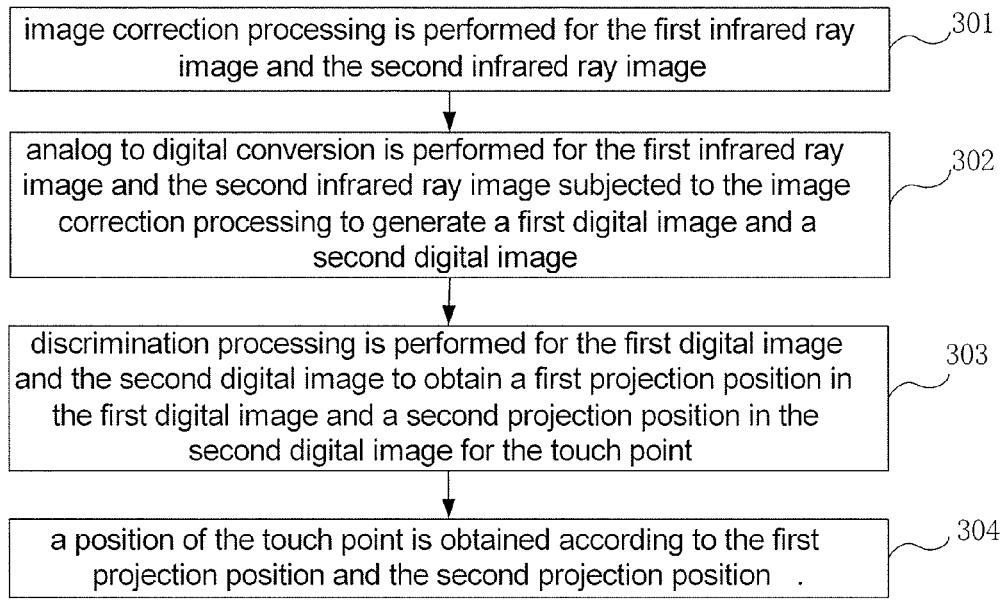
FIG. 3 is a flow schematic diagram of step 103 in the multi-touch positioning method provided by the first embodiment of the present invention.

The technical solution of the present invention will be further described in details in conjunction with the figures and the embodiments.

DETAILED DESCRIPTION OF THE PREFERRED EMBODIMENTS

FIG. 1 is a flow schematic diagram of a multi-touch positioning method provided by a first embodiment of the present invention. As shown in FIG. 1, the present embodiment can comprise following steps.

Step 101: a first infrared ray generator set at a first angle of a display panel emits infrared rays at a first wavelength, and a second infrared ray generator set at a second angle emits infrared rays at a second wavelength.

FIG. 2 is a schematic diagram of the multi-touch positioning method provided by the first embodiment of the present invention. The first angle and the second angle are adjacent angles, as shown in FIG. 2. An infrared ray generator 10 and an infrared ray generator 11 locate at two angles of the display panel respectively, as shown by a point A and a point B in FIG. 2. Emission angles of the infrared ray generator 10 and the infrared ray generator 11 are both greater than or equal to 90 degrees so as to cover the whole display panel (for example, if the emission angle of the infrared ray generator 10 is 90 degrees, it is ∠BAD in FIG. 2; if the emission angle of the infrared ray generator 11 is 90 degrees, it is ∠ABC in FIG. 2), and wavelengths of the infrared ray generator 10 and the infrared ray generator 11 are different, for example, the wavelengths thereof can be 940 nm and 880 nm, respectively. An infrared ray image sensor 12 and an infrared ray image sensor 13 are infrared ray image sensors corresponding to the infrared ray generator 10 and the infrared ray generator 11 respectively, and locate at opposite angles of angles at which the infrared ray generator 10 and the infrared ray generator 11 are located, respectively, as shown by a point C and a point D in FIG. 2. Wavelengths of the infrared ray image sensor 12 and the infrared ray image sensor 13 are identical with the corresponding wavelengths of the infrared ray generator 10 and the infrared ray generator 11, that is, the wavelengths of the infrared ray image sensor 12 and the infrared ray generator 10 are identical, and the wavelengths of the infrared ray image sensor 13 and the infrared ray generator 11 are identical. Sensing angles of the infrared ray image sensor 12 and the infrared ray image sensor 13 are greater than or equal to 90 degrees so as to cover the whole display panel (for example, if the sensing angle of the infrared ray image sensor 12 is 90 degrees, it is ∠BCD in FIG. 2; if the sensing angle of the infrared ray image sensor 13 is 90 degrees, it is ∠ADC in FIG. 2).

Step 102: a first infrared ray image sensor set at an opposite angle of the first angle receives the infrared rays of the first wavelength and generates a first infrared ray image, and a second infrared ray image sensor set at an opposite angle of the second angle receives the infrared rays of the second wavelength and generates a second infrared ray image.

In FIG. 2, filters can be set in front of lens of the infrared ray image sensors 12 and 13 for filtering out light waves outside wavelength ranges corresponding to the infrared ray image sensors 12 and 13, so that imaging on the infrared ray image sensors 12 and 13 is not interfered. The infrared ray image sensors 12 and 13 can adopt Charge Coupled Device (CCD) image sensors used in digital cameras, or adopt Complementary Metal-Oxide Semiconductor (CMOS) image sensors. In the present invention, a requirement for sensing frequencies of the infrared ray image sensors 12 and 13, i.e., frequencies for collecting image data, is that the sensing frequencies are not lower than refreshing rate of image displayed on the display panel. For example, the sensing frequency of the infrared ray image sensors 12 and 13 can be set as 120 Hz, because at present refreshing rates of images displayed by most display panels are lower than or equal to 120 Hz. It must be explained that the infrared ray images generated herein in the step 102 are analog infrared ray images; when adopting the CCD image sensor or the CMOS image sensor, only electrons are generated in CCD devices or CMOS devices of corresponding sensors after sensing the infrared rays, and there is no image in physical sense. We refer to the process of generating electrons in the CCD devices or the CMOS devices of the corresponding sensors after the CCD image sensor or the CMOS image sensor senses the infrared rays as generating infrared ray images only for the sake of convenience in description.

Step 103: processings for the first infrared ray image and the second infrared ray image are performed to determine at least one touch point, wherein the processings for the first infrared ray image and the second infrared ray image comprise identification processing and touch point position recognition processing. The identification processing can be implemented by means of subsequently determining a first marking position and a second marking position belonging to a same touch point.

In the present embodiment, the processings for the infrared ray images can comprise image correction, analog to digital conversion, discrimination processing, etc.

The present embodiment captures touch signals by using the infrared ray generators set at two adjacent angles of the display panel and the infrared ray image sensors set at opposite angles of the two adjacent angles, to enable the touch screen to recognize multiple touch points simultaneously and achieve a multi-touch positioning function of the touch screen; accuracy for recognizing the touch points is high, and the method is easy to carry out.

FIG. 3 is a flow schematic diagram of step 103 in the multi-touch positioning method provided by the first embodiment of the present invention. As shown in FIG. 3, the step 103 in the present embodiment can further comprise following steps.

Step 301: image correction processing is performed for the first infrared ray image and the second infrared ray image.

Since different lens may generate different distortions, resulting in decrease in image brightness of areas around the lens, so that the collected image data is distorted. Therefore, the distortion can be removed by performing the image correction processing for the generated infrared ray images.

Step 302: analog to digital conversion is performed for the first infrared ray image and the second infrared ray image subjected to the image correction processing, to generate a first digital image and a second digital image.

Since the generated infrared ray images are analog signals, they have to be subjected to the analog to digital conversion to become digital signals, in order to be processed in digital processing devices such as digital signal processors, etc.

Step 303: discrimination processing is processed for the first digital image and the second digital image, to obtain a first projection position in the first digital image for the touch point and a second projection position in the second digital image for the touch point.

Figure 13:
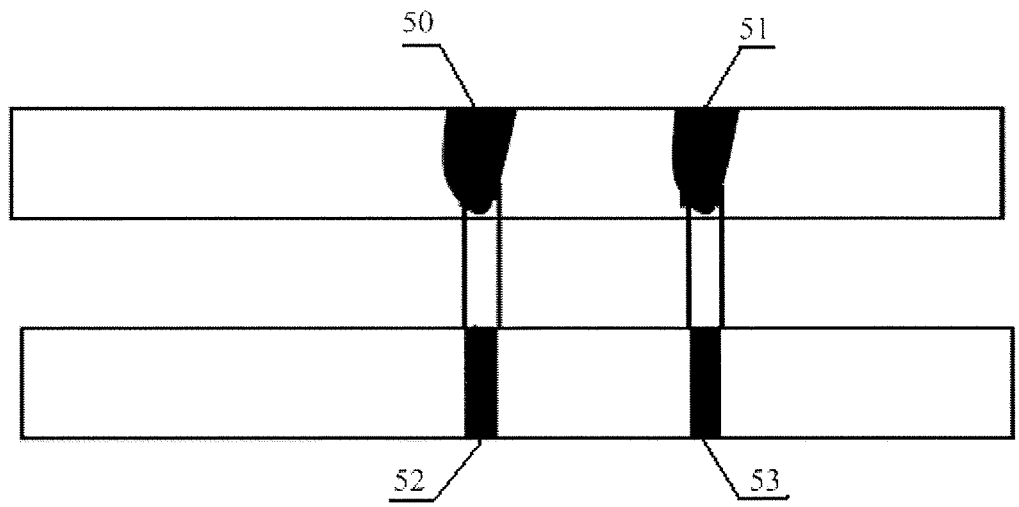
FIG. 13 is a schematic diagram of a correspondence relationship between a digital image and touch area in a general situation in the multi-touch positioning method provided by the first embodiment of the present invention.
Figure 14:
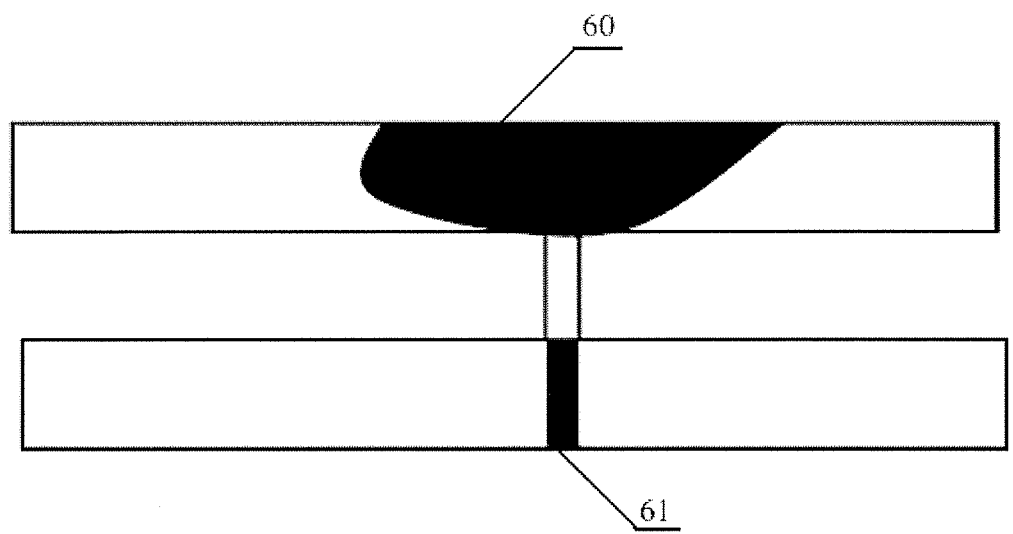
FIG. 14 is a schematic diagram of a correspondence relationship between the digital image and the touch area in a specific situation in the multi-touch positioning method provided by the first embodiment of the present invention.

FIG. 13 is a schematic diagram of a correspondence relationship between a digital image and touch area in a general situation in the multi-touch positioning method provided by the first embodiment of the present invention, and FIG. 14 is a schematic diagram of a correspondence relationship between the digital image and the touch area in a specific situation in the multi-touch positioning method provided by the first embodiment of the present invention. In FIG. 13, an area 50 and an area 51 correspond to digital images of two fingers. Then, corresponding touch areas are obtained by analysis according to the digital images, as shown by an area 52 and an area 53. Projection position of the touch point in the digital image can be further determined according to the touch area, for example, a center point of the touch area is selected as the projection position of the touch point in the digital image. In special situations in which the finger is very close to the infrared ray image sensor, a touch finger corresponds to a very large digital image, as shown by an area 60 in FIG. 14. At this moment, an area 61 in a central portion of the digital image can be selected as the touch area, and the projection position of the touch point in the digital image is further determined according to the area 61, for example, a center point of the touch area is selected as the projection position of the touch point in the digital image.

Step 304: a position of the touch point is obtained according to the first projection position and the second projection position.

Figure 4:
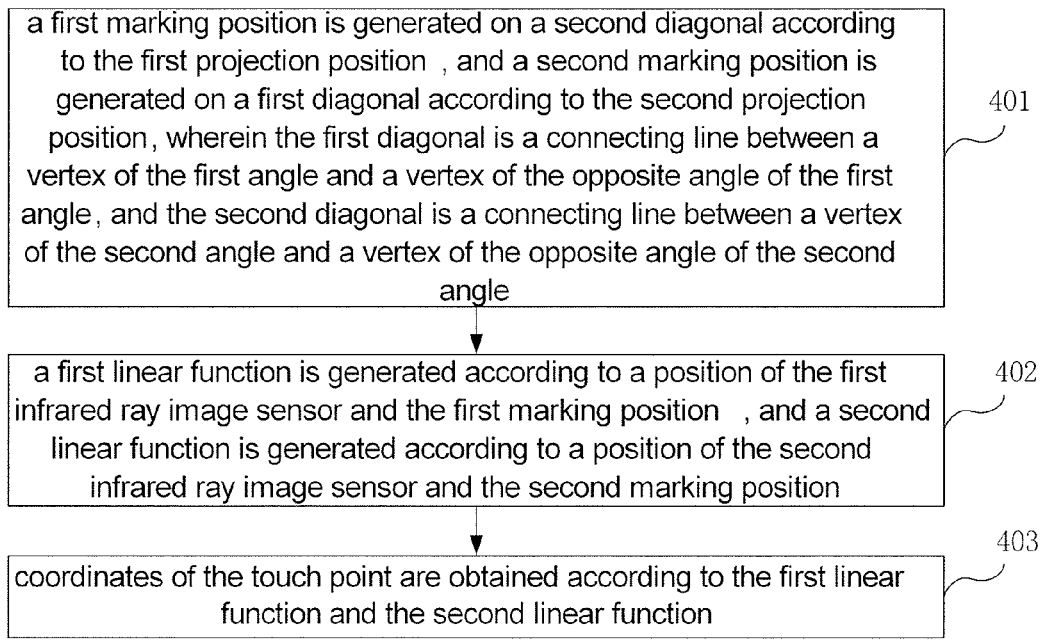
FIG. 4 is a flow schematic diagram of step 304 in the multi-touch positioning method provided by the first embodiment of the present invention.

FIG. 4 is a flow schematic diagram of step 304 in the multi-touch positioning method provided by the first embodiment of the present invention. As shown in FIG. 4, the step 304 in the present embodiment can further comprise following steps.

Step 401: a first marking position is generated on a second diagonal according to the first projection position, and a second marking position is generated on a first diagonal according to the second projection position, wherein the first diagonal is a connecting line between a vertex of the first angle (i.e., the angle at which the first infrared ray generator is located) and a vertex of the opposite angle of the first angle, and the second diagonal is a connecting line between a vertex of the second angle (i.e., the angle at which the second infrared ray generator is located) and a vertex of the opposite angle of the second angle.

Referring to FIG. 2, a point E' is a marking position of a touch point E on a diagonal BD, and a point E" is a marking position of a touch point E on a diagonal AC.

Figure 15:
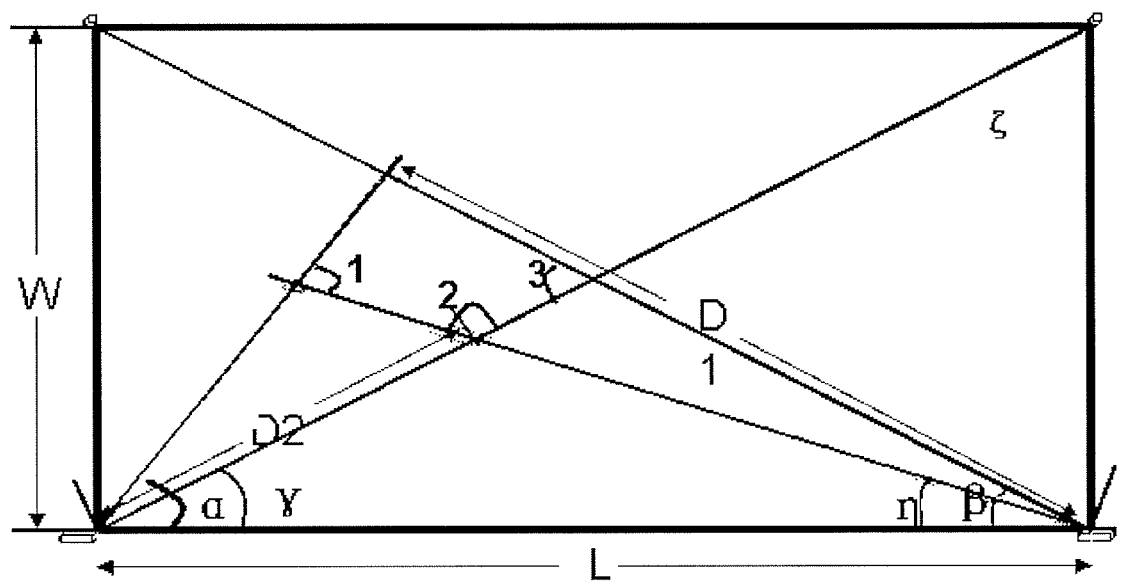
FIG. 15 is a schematic diagram of an identification processing method in a specific situation in the multi-touch positioning method provided by the first embodiment of the present invention.

Here, we provide a method for the identification processing. When multiple touch points exist, there are multiple first marking positions and multiple second marking positions. Firstly, it has to determine to which first marking position and which second marking position each touch point corresponds respectively. For each touch point, a connecting line between the first marking position and the corresponding infrared ray sensor and a connecting line of a side at which the infrared ray sensor is located form an included angle $\alpha$, and a connecting line between the second marking position and the corresponding infrared ray sensor and a connecting line of a side at which the infrared ray sensor is located form an included angle $\eta$. When multiple touch points exist, multiple angles $\alpha$ and multiple angles $\eta$ will present. A first marking position and a second marking position belonging to a touch point can be determined as long as a pair of angles $\alpha$ and $\eta$ belonging to that touch point is determined. Hereinafter, a method for determining angles $\alpha$ and $\eta$ belonging to one touch point is explained by taking FIG. 15 as an example. FIG. 15 is a schematic diagram of an identification processing method in a specific situation in the multi-touch positioning method provided by the first embodiment of the present invention. As shown in FIG. 15, for each touch point, one quadrangle is constructed by taking the touch point, a first marking position corresponding to the touch point, a second marking position corresponding to the touch point, and a center point of a display area (i.e., an intersection point of a first diagonal and a second diagonal) as vertexes. In the quadrangle, there exist following relationships:

angle 1=$\alpha$+$\eta$, angle 2=180−($\gamma$+$\eta$), angle 3=2 arctg($W/L$), angle 4=180−($\alpha$+$\beta$), wherein W is a width of the display area of the touch screen, L is a length of the display area of the touch screen, angle $\gamma$, angle $\beta$, angle 3 can be determined by lengths of sides of the display area, and angle $\gamma$=angle $\beta$=arctg ($W/L$), which is a known angle.

When the angle 1 and the angle 2 calculated from a pair of angles $\alpha$ and $\eta$ selected from the multiple angles $\alpha$ and the multiple angles $\eta$ satisfy (angle 1+angle 2+angle 3+angle 4)=360, the angle $\alpha$ and the angle $\eta$ correspond to a same touch point, so that the first marking position and the second marking position corresponding to the touch point are determined according to the angle α and the angle η. If (angle 1+angle 2+angle 3+angle 4)≠360, then the angle α and the angle η do not correspond to the same touch point, and a combination of the angle α and the angle η is re-selected to perform validation.

Step 402: a first linear function is generated according to a position of the first infrared ray image sensor (i.e., a position of the vertex of the opposite angle of the first angle) and the first marking position, and a second linear function is generated according to a position of the second infrared ray image sensor (i.e., a position of the vertex of the opposite angle of the second angle) and the second marking position.

Referring to FIG. 2, a function of a straight line CE' can be obtained according to a position of the point C and a position of the point E', and a function of a straight line DE" can be obtained according to a position of the point D and a position of the point E".

Step 403: coordinates of the touch point are obtained according to the first linear function and the second linear function.

Referring to FIG. 2, the touch point E is an intersection point of the straight line CE' and the straight line DE", and thus coordinates of the touch point E can be obtained by solving a common solution of the function of the straight line CE' and the function of the straight line DE", that is, position information of the touch point E is obtained.

In the present embodiment, a method for obtaining position information of another touch point F in FIG. 2 is the same to the method for obtaining the position information of the touch point E, and is omitted herein. Further, the present embodiment can also have multiple touch points (not shown in the figure), and methods for obtaining position information of each of the touch points are all the same to the method for obtaining the position information of the touch point E.

Alternatively, in the first embodiment, the second embodiment and the third embodiment of the multi-touch positioning method of the present invention, the first angle and the second angle may also be opposite angles, that is, the first infrared ray generator and the second infrared ray generator may also be set oppositely. At this time, the first infrared ray image sensor is located at an opposite angle of the angle at which the first infrared ray generator is located, and the second infrared ray image sensor is located at an opposite angle of the angle at which the second infrared ray generator is located. When the first angle and the second angle are opposite angles, a flow schematic diagram of the multi-touch positioning method may be the same as the flow schematic diagram of the multi-touch positioning method provided by the first embodiment of the present invention as shown in FIG. 1, or may be the same as the flow schematic diagram of the second embodiment of the multi-touch positioning method of the present invention as shown in FIG. 3, and is omitted herein. In one embodiment of the multi-touch positioning method in which the first angle and the second angle are opposite angles, as compared with the flow schematic diagram of the second embodiment of the multi-touch positioning method of the present invention as shown in FIG. 3, determining the position of the touch point according to the first projection position and the second projection position can further include following steps: the first marking position is generated on a second diagonal according to the first projection position, and the second marking position is generated on a second diagonal according to the second projection position, wherein the second diagonal is a connecting line between vertexes of two adjacent angles of the first angle; the first linear function is generated according to a position of the vertex of the opposite angle of the first angle and the first marking position, and the second linear function is generated according to a position of the vertex of the opposite angle of the second angle and the second marking position; and coordinates of the touch point are obtained according to the first linear function and the second linear function.

The present invention captures the touch signal by using the infrared ray generators set at two arbitrary angles of the display panel and the infrared ray image sensors set at the opposite angles of the two angles, to enable the touch screen to recognize multiple touch points simultaneously and achieve a multi-touch positioning function of the touch screen; accuracy for recognizing the touch points is high and the method is easy to carry out.

In the above multi-touch screen using a pair of infrared ray generators and a pair of infrared ray sensor, when the two infrared ray generators are set at two opposite angles of the display panel, the two corresponding infrared ray sensors are located at two opposite angles accordingly, and thus a touch point on a connecting line between vertexes of two opposite angles at which the two infrared ray sensors are respectively located cannot be recognized. In order to improve such situation and further increase the accuracy for recognizing the touch points at the same time, four infrared ray generators set at fourth angles of the display panel and corresponding infrared ray image processors can be adopted simultaneously.

Figure 5:
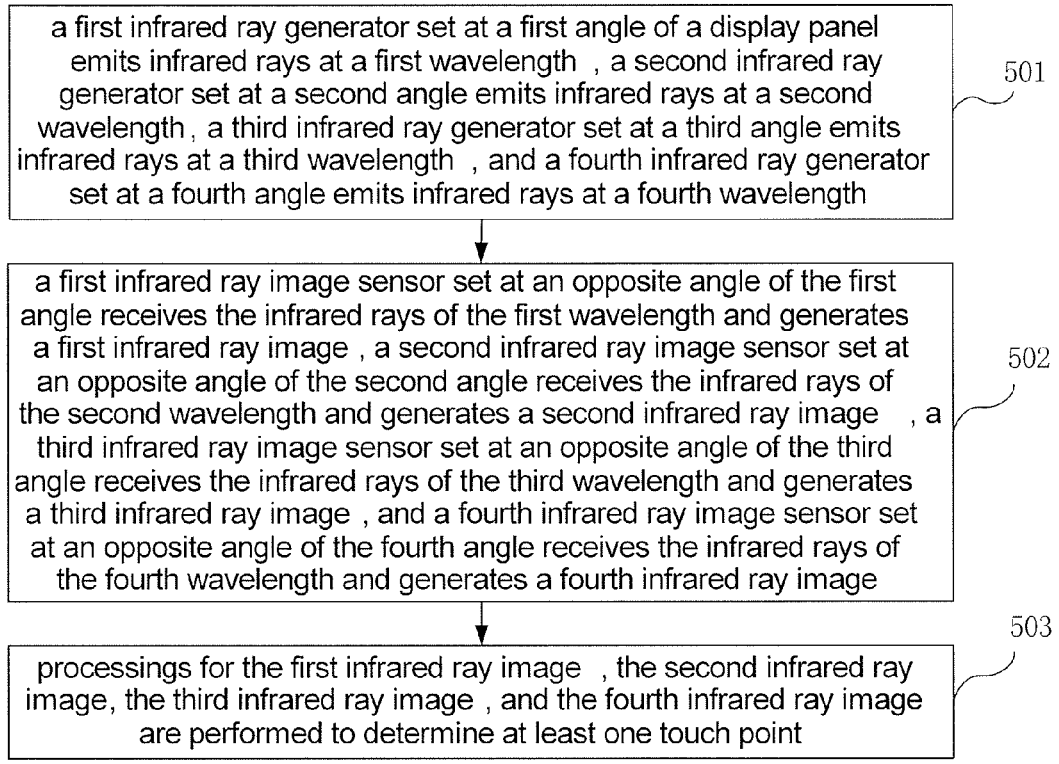
FIG. 5 is a flow schematic diagram of a multi-touch positioning method provided by a second embodiment of the present invention.

FIG. 5 is a flow schematic diagram of a multi-touch positioning method provided by a second embodiment of the present invention. As shown in FIG. 5, the present embodiment can comprise following steps.

Step 501: a first infrared ray generator set at a first angle of a display panel emits infrared rays at a first wavelength, a second infrared ray generator set at a second angle emits infrared rays at a second wavelength, a third infrared ray generator set at a third angle emits infrared rays at a third wavelength, and a fourth infrared ray generator set at a fourth angle emits infrared rays at a fourth wavelength.

Figure 6:
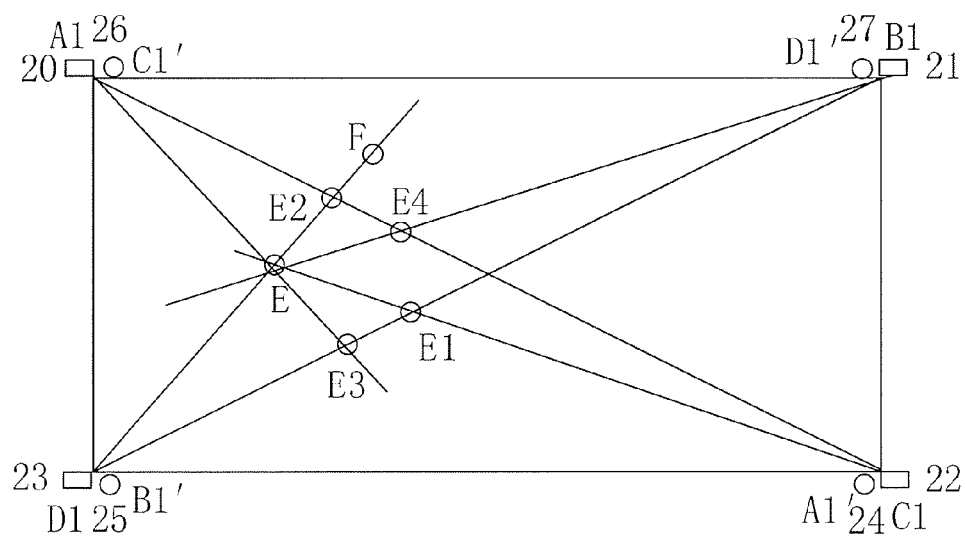
FIG. 6 is a schematic diagram of the multi-touch positioning method provided by the second embodiment of the present invention.

FIG. 6 is a schematic diagram of the multi-touch positioning method provided by the second embodiment of the present invention. As shown in FIG. 6, an infrared ray image sensor 20, an infrared image sensor 21, an infrared ray image sensor 22, and an infrared ray image sensor 23 are located at four angles of a display panel respectively, as shown by a point A1, a point B1, a point C1, and a point D1. An infrared ray generator 24, an infrared ray generator 25, an infrared ray generator 26, and an infrared ray generator 27 corresponding to the infrared ray image sensors 20, 21, 22, and 23 are respectively located at opposite angles of the angles at which the corresponding infrared ray image sensor 20, 21, 22, and 23 are located, as shown by a point A1', a point B1', a point C1', and a point D1'. Moreover, emission angles of the infrared ray generators 24, 25, 26, and 27 are all greater than or equal to 90 degrees so as to cover the whole display panel, and sensing angles of the infrared ray image sensors 20, 21, 22, and 23 are also greater than or equal to 90 degrees so as to cover the whole display panel. Wavelengths of the infrared ray generators 24, 25, 26, and 27 are different, for example, the wavelengths may be 940 nm, 880 nm, 850 nm, and 830 nm, respectively, and wavelengths of the infrared ray image sensor 20, 21, 22, and 23 may correspondingly be 940 nm, 880 nm, 850 nm, and 830 nm. Two touch points E and F are located on a same straight line ED1.

Step 502: a first infrared ray image sensor set at an opposite angle of the first angle receives the infrared rays of the first wavelength and generates a first infrared ray image, a second infrared ray image sensor set at an opposite angle of the second angle receives the infrared rays of the second wavelength and generates a second infrared ray image, a third infrared ray image sensor set at an opposite angle of the third angle receives the infrared rays of the third wavelength and generates a third infrared ray image, and a fourth infrared ray image sensor set at an opposite angle of the fourth angle receives the infrared rays of the fourth wavelength and generates a fourth infrared ray image.

Filters can be set in front of lens of the infrared ray image sensors 20, 21, 22, and 23 for filtering out light waves outside wavelength ranges corresponding to the infrared ray image sensors 20, 21, 22, and 23, so that imaging on pictures is not interfered. The infrared ray image sensors 20, 21, 22, and 23 can adopt CCD image sensors or CMOS image sensors. In the present invention, a requirement for sensing frequencies of the infrared ray sensors 20, 21, 22, and 23 is that the sensing frequencies are not lower than refreshing rate of image displayed on the display panel. For example, a sensing frequency of the infrared ray image sensors 20, 21, 22, and 23, i.e., a frequency for collecting image data, can be set as 120 Hz, because at present refreshing rates of images displayed on most display panels are lower than or equal to 120 Hz.

Step 503: processings for the first infrared ray image, the second infrared ray image, the third infrared ray image, and the fourth infrared ray image are performed to determine at least one touch point, wherein the processings for the first infrared ray image, the second infrared ray image, the third infrared ray image, and the fourth infrared ray image comprise identification processing and touch point position recognition processing. The identification processing can similarly be implemented by means of determining a first marking position and a second marking position belonging to a same touch point in the multi-touch positioning method provided by the first embodiment of the present invention, and is omitted herein.

In the present embodiment, the processings for the infrared ray images can comprise image correction, analog to digital conversion, discrimination processing, etc.

The present embodiment captures touch signals by using the infrared ray generators set at the four angles of the display panel and the infrared ray image sensors set at opposite angles of the four angles, so that the touch screen is able to recognize multiple touch points simultaneously, the accuracy for recognizing the touch points can be further increased as compared with the touch screen with two infrared ray generators and two infrared ray image sensors, and a multi-touch positioning function of the touch screen is achieved. Therefore, advanced operation functions, such as rotating and zooming a picture with touch by multiple fingers, dragging a video which is currently playing and simultaneously switching windows with touch by multiple fingers, touching multiple folders to perform operations such as dragging or deleting, etc. with touch by multiple fingers, can be implemented on touch systems, and the method is easy to carry out.

Figure 7:
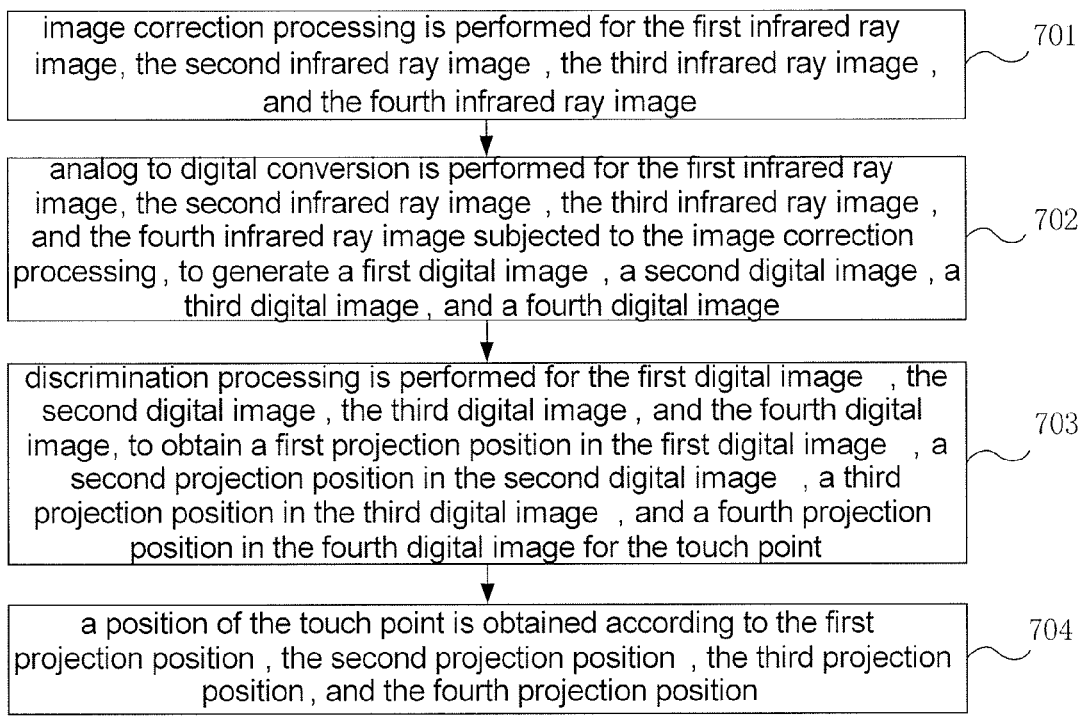
FIG. 7 is a flow schematic diagram of step 503 in the multi-touch positioning method provided by the second embodiment of the present invention.

FIG. 7 is a flow schematic diagram of the step 503 in the multi-touch positioning method provided by the second embodiment of the present invention. As shown in FIG. 7, the step 503 in the present embodiment can further comprise following steps.

Step 701: image correction processing is performed for the first infrared ray image, the second infrared ray image, the third infrared ray image, and the fourth infrared ray image.

Since different lens may generate different distortions, resulting in decrease in image brightness of areas around the lens, such that the collected image data is distorted. Therefore, the distortion can be removed by performing the image correction processing for the generated infrared ray images.

Step 702: analog to digital conversion is performed for the first infrared ray image, the second infrared ray image, the third infrared ray image, and the fourth infrared ray image subjected to the image correction processing, to generate a first digital image, a second digital image, a third digital image, and a fourth digital image.

Since the generated infrared ray images are analog signals, they can be converted into digital signals through the analog to digital conversion, so that image signals can be processed in digital signal processors.

Step 703: discrimination processing is performed for the first digital image, the second digital image, the third digital image, and the fourth digital image, to obtain a first projection position in the first digital image, a second projection position in the second digital image, a third projection position in the third digital image, and a fourth projection position in the fourth digital image for the touch point.

Here, a schematic diagram of a correspondence relationship between the digital image and the touch area can be as shown in FIG. 13 or FIG. 14, and is omitted herein.

Step 704: a position of the touch point is obtained according to the first projection position, the second projection position, the third projection position, and the fourth projection position.

Figure 8:
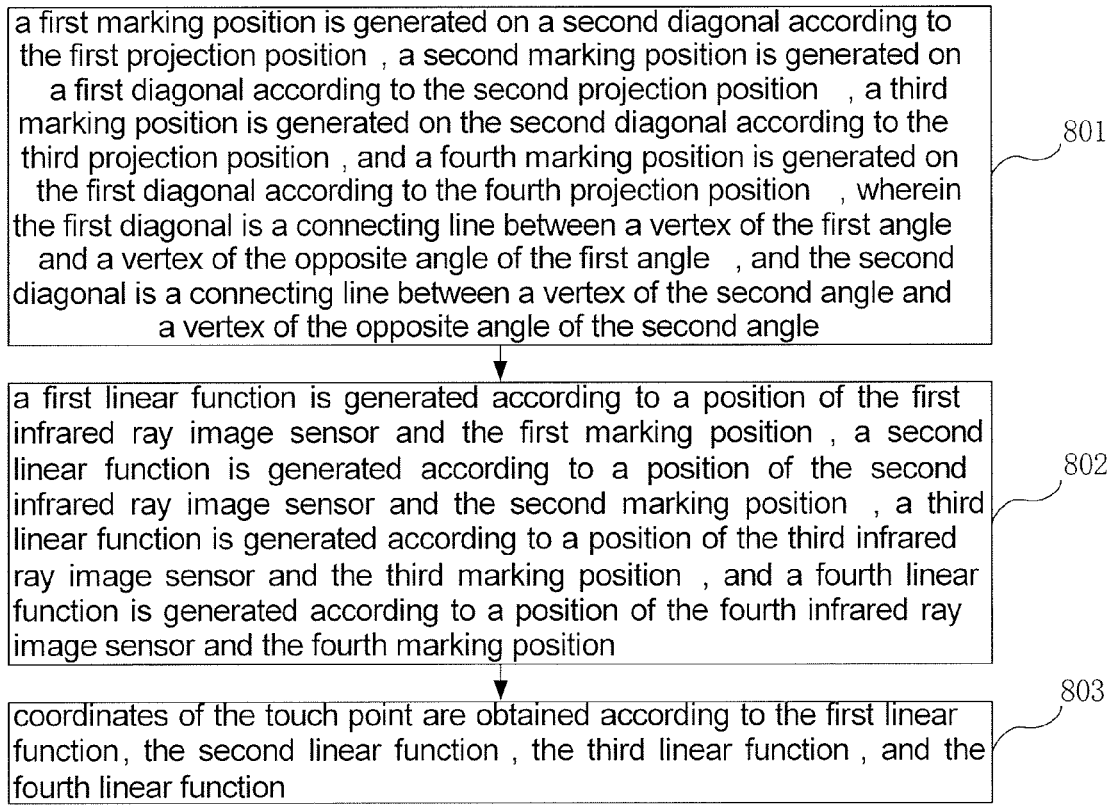
FIG. 8 is a flow schematic diagram of step 704 in the multi-touch positioning method provided by the second embodiment of the present invention.

FIG. 8 is a flow schematic diagram of the step 704 in the multi-touch positioning method provided by the second embodiment of the present invention. As shown in FIG. 8, the step 704 in the present embodiment can further comprise following steps.

Step 801: the first marking position is generated on a second diagonal according to the first projection position, the second marking position is generated on a first diagonal according to the second projection position, a third marking position is generated on the second diagonal according to the third projection position, and a fourth marking position is generated on the first diagonal according to the fourth projection position, wherein the first diagonal is a connecting line between a vertex of the first angle and a vertex of the opposite angle of the first angle, and the second diagonal is a connecting line between a vertex of the second angle and a vertex of the opposite angle of the second angle.

Referring to FIG. 6, a point E1 is a marking position of a touch point E on a diagonal B1D1, a point E2 is a marking position of the touch point E on a diagonal A1C1, a point E3 is a marking position of the touch point E on the diagonal B1D1, and a point E4 is a marking position of the touch point E on the diagonal A1C1.

Step 802: a first linear function is generated according to a position of the first infrared ray image sensor (i.e., a position of the vertex of the opposite angle of the first angle) and the first marking position, a second linear function is generated according to a position of the second infrared ray image sensor (i.e., a position of the vertex of the opposite angle of the second angle) and the second marking position, a third linear function is generated according to a position of the third infrared ray image sensor (i.e., a position of the vertex of the opposite angle of the third angle) and the third marking position, and a fourth linear function is generated according to a position of the fourth infrared ray image sensor (i.e., a position of the vertex of the opposite angle of the fourth angle) and the fourth marking position.

Referring to FIG. 6, a function of a straight line C1E1 can be obtained according to a position of the point C1 and a position of the point E1, a function of a straight line D1E2 can be obtained according to a position of the point D1 and a position of the point E2, a function of a straight line A1E3 can be obtained according to a position of the point E3 and a position of the point A1, and a function of a straight line B1E4 can be obtained according to a position of the point E4 and a position of the point B1.

Step 803: coordinates of the touch point are obtained according to the first linear function, the second linear function, the third linear function, and the fourth linear function.

Referring to FIG. 6, the touch point E is an intersection point of the straight line C1E1, the straight line D1E2, the straight line A1E3, and the straight line B1E4, and thus coordinates of the touch point E can be obtained by solving a common solution of the function of the straight line C1E1, the function of the straight line D1E2, the function of the straight line A 1E3, and the function of the straight line B1E4, that is, position information of the touch point E is obtained.

In the present embodiment, for a touch point F in FIG. 6, a method for determining position information is the same to the aforesaid method for determining the position information of the touch point E, and is omitted herein. If there are multiple touch points at the same time, methods for determining position information of each touch point are all the same to the aforesaid method for determining the position information of the touch point E.

The present embodiment captures touch signals by using the infrared ray generators set at the four angles of the display panel and the infrared ray image sensors set at opposite angles of the four angles, so that the touch screen is able to recognize multiple touch points simultaneously and is also able to accurately recognize two points located on a same straight line with a same infrared ray image sensor, and a multi-touch positioning function of the touch screen is efficiently achieved. Therefore advanced operation functions, such as rotating and zooming a picture with touch by multiple fingers, dragging a video which is currently playing and simultaneously switching windows with touch by multiple fingers, touching multiple folders to perform operations such as dragging or deleting, etc. with touch by multiple fingers, can be implemented on touch systems, the accuracy for recognizing the touch points is further increased, and the method is easy to carry out.

In order to implement the aforesaid multi-touch positioning method, the present invention also provides a multi-touch screen capable of implementing the aforesaid method.

Figure 9:
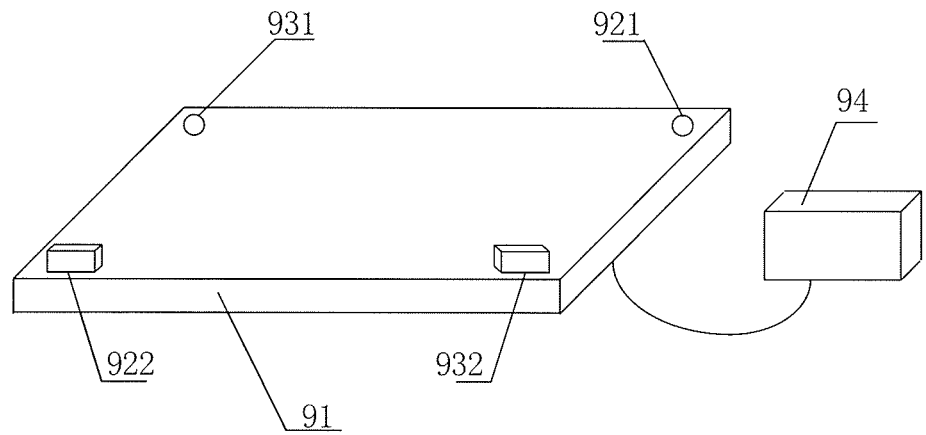
FIG. 9 is a structural schematic diagram of a multi-touch screen provided by a third embodiment of the present invention.

FIG. 9 is a structural schematic diagram of a multi-touch screen provided by a third embodiment of the present invention. As shown in FIG. 9, the present embodiment can comprise a display panel 91, a first infrared ray generator 921 set at a first angle of the display panel, a second infrared ray generator 931 set at a second angle of the display panel, a first infrared ray image sensor 922 set at an opposite angle of the first angle, a second infrared ray image sensor set 932 at an opposite angle of the second angle, and a control processing sub-system 94 connected to the display panel. The display panel 91 is used to receive touch events; the first infrared ray generator 921 is used to emit infrared rays at a first wavelength; the second infrared ray generator 931 is used to emit infrared rays at a second wavelength; the first infrared ray image sensor 922 is used to receive the infrared rays emitted by the first infrared ray generator 921 at the first wavelength and to generate a first infrared ray image; the second infrared ray image sensor 932 is used to receive the infrared rays emitted by the second infrared ray generator 931 at the second wavelength and to generate a second infrared ray image; and the control processing sub-system 94 is used to perform processing for the first infrared ray image generated by the first infrared ray image sensor 922 and the second infrared ray image generated by the second infrared ray image sensor 932, to determine at least one touch point. Among these, the infrared ray generators 921 and 931 have emission angles greater than or equal to 90 degrees to cover the whole display panel, and the infrared ray image sensors 922 and 932 have sensing angles greater than or equal to 90 degrees to cover the whole display panel. In addition, a first filter can be set in front of lens of the first infrared ray image sensor 922, and a wavelength of the filter is the first wavelength for filtering out infrared rays outside the first wavelength; also, a second filter can be set in front of lens of the second infrared ray image sensor 932, and a wavelength of the filter is the second wavelength for filtering out infrared rays outside the second wavelength.

In the present embodiment, the control processing sub-system 94 can further comprise an identification processing sub-system for performing identification processing for the first infrared ray image generated by the first infrared ray image sensor and the second infrared ray image generated by the second infrared ray image sensor, and a touch point position recognition processing sub-system for performing touch point position recognition processing for the first infrared ray image generated by the first infrared ray image sensor and the second infrared ray image generated by the second infrared ray image sensor.

Figure 11:
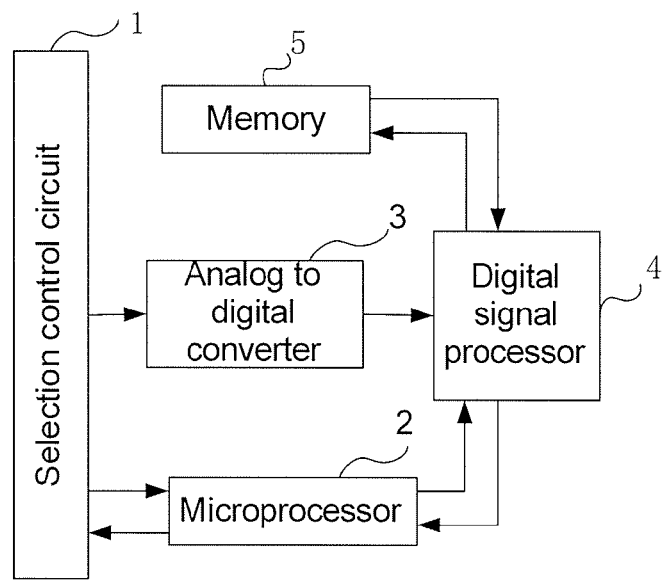
FIG. 11 is an internal structural schematic diagram of a touch point position recognition processing sub-system in the multi-touch screen provided by the third embodiment of the present invention.

In the present embodiment, the touch point position recognition processing sub-system can further comprise a selection control circuit 1, a microprocessor 2, a digital signal processor 4, and a memory 5 which are sequentially connected, and an analog to digital converter 3 connected between the selection control circuit 1 and the digital signal processor 4, as shown in FIG. 11. Among these, the microprocessor 2 is used to drive the first infrared ray generator 921 set at the first angle of the display panel to emit infrared rays at the first wavelength, drive the second infrared ray generator 931 set at the second angle of the display panel to emit infrared rays at the second wavelength, drive the first infrared ray image sensor 922 to receive the infrared rays of the first wavelength and generate the first infrared ray image, and drive the second infrared ray image sensor 932 to receive the infrared rays of the second wavelength and generate the second infrared ray image. In particular, the microprocessor 2 drives the infrared ray generators and the infrared ray image sensors through the selection control circuit 1 to complete the above operations. The selection control circuit 1 is used to perform image correction processing for the first infrared ray image generated by the first infrared ray image sensor 922 and the second infrared ray image generated by the second infrared ray image sensor 932, respectively, to remove image distortion. The analog to digital converter 3 is used to perform analog to digital conversion for the first infrared ray image and the second infrared ray image subjected to the image correction processing output from the selection control circuit 1, to generate a first digital image and a second digital image. The digital signal processor 4 is used to perform discrimination processing for the first digital image and the second digital image generated by the analog to digital converter 3, to obtain position information of the touch point. The memory 5 is used to store the position information of the touch point obtained by the digital signal processor 4.

Figure 12:
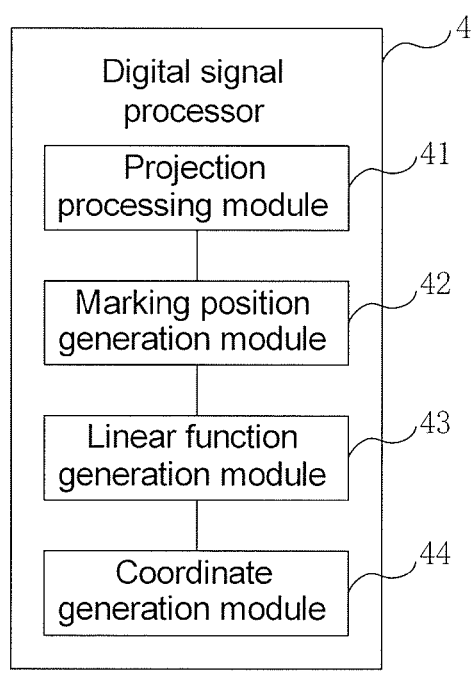
FIG. 12 is an internal structural schematic diagram of a digital signal processor in the multi-touch screen provided by the third embodiment of the present invention.

Further, FIG. 12 is an internal structural schematic diagram of a digital signal processor in the multi-touch screen provided by the third embodiment of the present invention. As shown in FIG. 12, the digital signal processor 4 can further comprise a projection processing module 41, a marking position generation module 42, a linear function generation module 43, and a coordinate generation module 44. Among these, the projection processing module 41 is able to perform the discrimination processing for digital images generated by the analog to digital converter 3 to obtain projection positions in the corresponding digital images for the touch point, and then the marking position generation module 42 generates the marking positions on the corresponding diagonals according to the projection positions. The linear function generation module 43 generates linear functions according to positions of the vertexes of the angles at which the infrared ray image sensors are located and the marking positions. At last, the coordinate generation module 44 obtains coordinates of the touch point according to the at least two linear functions generated by the linear function generation module 43. In particular, firstly, the projection processing module 41 performs the discrimination processing for the first digital image and the second digital image generated by the analog to digital converter 3 to obtain a first projection position in the first digital image and a second projection position in the second digital image for the touch point. Then, the marking position generation module 42 generates a first marking position on a second diagonal according to the first projection position, and generates a second marking position on a first diagonal according to the second projection position, wherein the first diagonal is a connecting line between a vertex of the first angle (i.e., the angle at which the first infrared ray generator is located) and a vertex of the opposite angle of the first angle, and the second diagonal is a connecting line between a vertex of the second angle (i.e., the angle at which the second infrared ray generator is located) and a vertex of the opposite angle of the second angle. The linear function generation module 43 further generates a first linear function according to a position of the vertex of the opposite angle of the first angle and the first marking position, and generates a second linear function according to a position of the vertex of the opposite angle of the second angle and the second marking position. Finally, the coordinate generation module 44 obtains coordinates of the touch point according to the first linear function and the second linear function generated by the linear function generation module 43.

The multi-touch screen provided by the present embodiment can recognize multiple touch points on the touch screen simultaneously. In addition, the multi-touch screen provided by the present embodiment greatly saves the touch screen cost due to omission of a touch panel portion. Further, since volume of the infrared ray generators and the infrared ray sensors is very small, its influence on size of the touch display screen is very little. Infrared rays are invisible lights, and adopting infrared rays will not affect normal display. The multi-touch screen of the present invention has high accuracy for recognizing touch points and is convenient to use.

Figure 10:
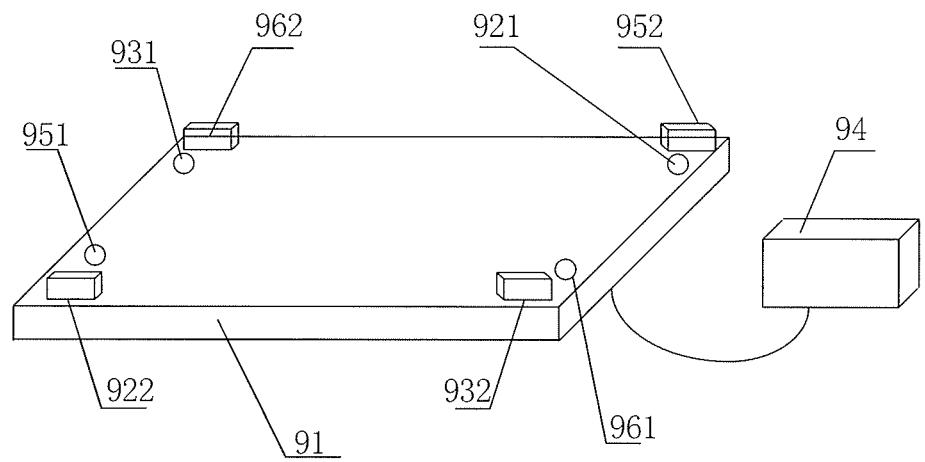
FIG. 10 is a structural schematic diagram of a multi-touch screen provided by a fourth embodiment of the present invention.

FIG. 10 is a structural schematic diagram of a multi-touch screen provided by a fourth embodiment of the present invention. As shown in FIG. 10, the multi-touch screen provided by the present embodiment can further comprise following means as compared with the multi-touch screen provided by the third embodiment of the present invention: a third infrared ray generator 951 set at a third angle of the display panel, a fourth infrared ray generator 961 set at a fourth angle of the display panel, a third infrared ray image sensor 952 set at an opposite angle of the third angle, and a fourth infrared ray image sensor 962 set at an opposite angle of the fourth angle. The third infrared ray generator 951 is used to emit infrared rays at a third wavelength, the fourth infrared ray generator 961 is used to emit infrared rays at a fourth wavelength, the third infrared ray image sensor 952 is used to receive the infrared rays emitted by the third infrared ray generator 951 at the third wavelength and to generate a third infrared ray image, and the fourth infrared ray image sensor 962 is used to receive the infrared rays emitted by the fourth infrared ray generator 961 at the fourth wavelength and to generate a fourth infrared ray image. At this time, the control processing sub-system 94 of the multi-touch screen is used to perform processing for the first infrared ray image generated by the first infrared ray image sensor 922, the second infrared ray image generated by the second infrared ray image sensor 932, the third infrared ray image generated by the third infrared ray image sensor 952, and the fourth infrared ray image generated by the fourth infrared ray image sensor 962, to determine at least one touch point. Among these, the infrared ray generators 921, 931, 951, and 961 have emission degrees greater than or equal to 90 degrees to cover the whole display panel, and the infrared ray image sensors 922, 932, 952, and 962 have sensing angles greater than or equal to 90 degrees to cover the whole display panel. In addition, a first filter can be set in front of lens of the first infrared ray image sensor 922, and a wavelength of the filter is the first wavelength for filtering out infrared rays outside the first wavelength. Also, a second filter can be set in front of lens of the second infrared ray image sensor 932, and a wavelength of the filter is the second wavelength for filtering out infrared rays outside the second wavelength; a third filter can be set in front of lens of the third infrared ray image sensor 952, and a wavelength of the filter is the third wavelength for filtering out infrared rays outside the third wavelength; and a fourth filter can be set in front of lens of the fourth infrared ray image sensor 962, and a wavelength of the filter is the fourth wavelength for filtering out infrared rays outside the fourth wavelength. In particular, the first, second, third, and fourth infrared ray generators in the present embodiment can be an infrared ray generator of 940 nm, an infrared ray generator of 880 nm, an infrared ray generator of 850 nm, and an infrared ray generator of 830 nm, respectively.

The multi-touch screen provided by the present embodiment can recognize multiple touch points on the touch screen simultaneously and can also accurately recognize two points located on a same straight line with a same infrared ray image sensor. In addition, the multi-touch screen provided by the present embodiment greatly saves the touch screen cost due to omission of a touch panel portion. Further, since volume of the infrared ray generators and the infrared ray sensors is very small, its influence on size of the touch display screen is very little. Infrared rays are invisible lights, and adopting infrared rays will not affect normal display. The multi-touch screen of the present invention has high accuracy for recognizing touch points and is convenient to use.

Further, as shown in FIG. 11, as compared with the multi-touch screen provided by the third embodiment of the present invention, the microprocessor 2 in the present embodiment is used to drive the first infrared ray generator 921 set at the first angle of the display panel to emit infrared rays at the first wavelength, drive the second infrared ray generator 931 set at the second angle of the display panel to emit infrared rays at the second wavelength, drive the third infrared ray generator 951 set at the third angle of the display panel to emit infrared rays at the third wavelength, drive the fourth infrared ray generator 961 set at the fourth angle of the display panel to emit infrared rays at the fourth wavelength, drive the first infrared ray image sensor 922 to receive the infrared rays of the first wavelength and generate the first infrared ray image, drive the second infrared ray image sensor 932 to receive the infrared rays of the second wavelength and generate the second infrared ray image, drive the third infrared ray image sensor 952 to receive the infrared rays of the third wavelength and generate the third infrared ray image, and drive the fourth infrared ray image sensor 962 to receive the infrared rays of the fourth wavelength and generate the fourth infrared ray image. In particular, the microprocessor 2 drives the infrared ray generators and the infrared ray image sensors through the selection control circuit 1 to complete the above operations. The selection control circuit 1 is used to perform image correction processing for the first infrared ray image generated by the first infrared ray image sensor 922, the second infrared ray image generated by the second infrared ray image sensor 932, the third infrared ray image generated by the third infrared ray image sensor 952, and the fourth infrared ray image generated by the fourth infrared ray image sensor 962, respectively, to remove image distortion. The analog to digital converter 3 is used to perform analog to digital conversion for the first infrared ray image, the second infrared ray image, the third infrared ray image, and the fourth infrared ray image subjected to the image correction processing output from the selection control circuit 1, to generate a first digital image, a second digital image, a third digital image, and a fourth digital image. The digital signal processor 4 is used to perform discrimination processing for the first digital image, the second digital image, the third digital image, and the fourth digital image generated by the analog to digital converter 3, to obtain position information of the touch point. The memory 5 is used to store the position information of the touch point obtained by the digital signal processor 4.

Workflow of the multi-touch screen of the present embodiment will be briefly described hereinafter: after the multi-touch screen is booted, the microprocessor drives the infrared ray generators to emit the infrared rays of corresponding wavelengths, and drive the infrared ray image sensors to receive infrared rays of corresponding wavelengths and generate analog image signals; the analog image signals generated by the infrared ray image sensors are subjected to the image correction processing by the selection control circuit, and then enter the analog to digital converter for analog to digital conversion through a path set by the selection control circuit, to form digital image signals; the digital signal processor performs the discrimination processing for the digital image signals output from the analog to digital converter, and obtain the position information of the touch point through analysis processing for the digital image signals; finally, the memory stores the position information of the touch point output from the digital image signals.

Referring to FIG. 12, in particular, the projection processing module 41 can perform the discrimination processing for the first digital image, the second digital signal, the third digital signal, and the fourth digital signal generated by the analog to digital converter 3 to obtain a first projection position in the first digital image, a second projection position in the second digital image, a third projection position in the third digital image and a fourth projection position in the fourth digital image for the touch point. Then, the marking position generation module 42 generates a first marking position on a second diagonal according to the first projection position, generates a second marking position on a first diagonal according to the second projection position, generates a third marking position on the second diagonal according to the third projection position, and generates a fourth marking position on the first diagonal according to the fourth projection position, wherein the first diagonal is a connecting line between a vertex of the first angle (i.e., the angle at which the first infrared ray generator is located) and a vertex of the opposite angle of the first angle, and the second diagonal is a connecting line between a vertex of the second angle (i.e., the angle at which the second infrared ray generator is located) and a vertex of the opposite angle of the second angle. The linear function generation module 43 generates a first linear function according to a position of the vertex of the opposite angle of the first angle and the first marking position, generates a second linear function according to a position of the vertex of the opposite angle of the second angle and the second marking position, generates a third linear function according to a position of the vertex of the opposite angle of the third angle and the third marking position, and generates a fourth linear function according to a position of the vertex of the opposite angle of the fourth angle and the fourth marking position. Finally, the coordinate generation module 44 obtains coordinates of the touch point according to the first linear function, the second linear function, the third linear function, and the fourth linear function generated by the linear function generation module 43.

The multi-touch screen provided by the present embodiment can recognize multiple touch points on the touch screen simultaneously and can also accurately recognize two points located on a same straight line with a same infrared ray image sensor. In addition, the multi-touch screen provided by the present embodiment greatly saves the touch screen cost due to omission of a touch panel portion. Further, since volume of the infrared ray generators and the infrared ray sensors is very small, its influence on size of the touch display screen is very little. Infrared rays are invisible lights, and adopting infrared rays will not affect normal display. The multi-touch screen of the present invention has high accuracy for recognizing touch points and is convenient to use.

Finally, it must be explained that the embodiments above are only used to explain but not limit the technical solution of the present invention; although the present invention has been explained in details with reference to the aforesaid embodiments, it should be understood by those of ordinary skills in the art that modifications can still be made to the technical solution disclosed by the foresaid embodiments, or equivalent replacements can be made to a part of technical features therein; and these modifications or replacements should not make nature of corresponding technical solutions depart from spirits and scopes of the technical solutions of embodiments of the present invention.

What is claimed is:
1. A multi-touch positioning method, comprising:
emitting, by a first infrared ray generator set at a first angle of a display panel, infrared rays at a first wavelength, and emitting, by a second infrared ray generator set at a second angle, infrared rays at a second wavelength;
receiving the infrared rays of the first wavelength and generating a first infrared ray image by a first infrared ray image sensor set at an opposite angle of the first angle, and receiving the infrared rays of the second wavelength and generating a second infrared ray image by a second infrared ray image sensor set at an opposite angle of the second angle; and
performing touch point position processings for the first infrared ray image and the second infrared ray image to determine at least one touch point, comprising:
performing image correction processing for the first infrared ray image and the second infrared ray image;
performing analog to digital conversion for the first infrared ray image and the second infrared ray image subjected to the image correction processing, to generate a first digital image and a second digital image;
performing discrimination processing for the first digital image and the second digital image, to obtain a first projection position in the first digital image of the touch point and a second projection position in the second digital image of the touch point;

determining a position of the touch point according to the first projection position and the second projection position, wherein when the first angle and the second angle are adjacent angles, following processings are performed:

generating a first marking position on a second diagonal according to the first projection position, and generating a second marking position on a first diagonal according to the second projection position, wherein the first diagonal is a connecting line between a vertex of the first angle and a vertex of the opposite angle of the first angle, and the second diagonal is a connecting line between a vertex of the second angle and a vertex of the opposite angle of the second angle;

generating a first linear function according to a position of the vertex of the opposite angle of the first angle and the first marking position, and generating a second linear function according to a position of the vertex of the opposite angle of the second angle and the second marking position; and obtaining coordinates of the touch point according to the first linear function and the second linear function; and wherein when the first angle and the second angle are opposite angles, following processings are performed:

generating a first marking position on a second diagonal according to the first projection position, and generating a second marking position on the second diagonal according to the second projection position, wherein the second diagonal is a connecting line between vertexes of two adjacent angles of the first angle;

generating a first linear function according to a position of the vertex of the opposite angle of the first angle and the first marking position, and generating a second linear function according to a position of the vertex of the opposite angle of the second angle and the second marking position; and obtaining coordinates of the touch point according to the first linear function and the second linear function.

2. The multi-touch positioning method according to claim 1, wherein emission angles of the first infrared ray generator and the second infrared ray generator are greater than or equal to 90 degrees, and sensing angles of the first infrared ray image sensor and the second infrared ray image sensor are greater than or equal to 90 degrees.

3. The multi-touch positioning method according to claim 2, further comprising: performing identification processing for the first infrared ray image and the second infrared ray image.

* * * * *